US009513422B2

(12) United States Patent
Kim et al.

(10) Patent No.: US 9,513,422 B2
(45) Date of Patent: Dec. 6, 2016

(54) OPTICAL-COMPENSATION FILM, OPTICAL-COMPENSATION POLARIZING SHEET AND LIQUID CRYSTAL DISPLAY

(71) Applicant: BOE TECHNOLOGY GROUP CO., LTD., Beijing (CN)

(72) Inventors: Ki Man Kim, Beijing (CN); Jaegeon You, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 98 days.

(21) Appl. No.: 14/361,830

(22) PCT Filed: Jun. 25, 2013

(86) PCT No.: PCT/CN2013/077916
§ 371 (c)(1),
(2) Date: May 30, 2014

(87) PCT Pub. No.: WO2014/153876
PCT Pub. Date: Oct. 2, 2014

(65) Prior Publication Data
US 2015/0042921 A1    Feb. 12, 2015

(30) Foreign Application Priority Data
Mar. 25, 2013   (CN) .......................... 2013 1 0097173

(51) Int. Cl.
*G02F 1/13363*   (2006.01)
*G02F 1/1343*    (2006.01)
(Continued)

(52) U.S. Cl.
CPC ............... *G02B 5/3083* (2013.01); *G02B 1/00* (2013.01); *G02F 1/1336* (2013.01);
(Continued)

(58) Field of Classification Search
CPC .................................................. G02F 1/13363
See application file for complete search history.

(56) References Cited

U.S. PATENT DOCUMENTS

2001/0038485 A1    11/2001   Hirabayashi
2004/0004681 A1*    1/2004   Ozawa .............. G02F 1/133555
                                              349/61

(Continued)

FOREIGN PATENT DOCUMENTS

CN    1318868 A    10/2001
CN    1841092 A    10/2006
(Continued)

OTHER PUBLICATIONS

International Search Report, International Preliminary Report on Patentability and Written Opinion of the International Searching Authority of PCT/CN2013/077916 in Chinese, mailed Jan. 2, 2014.
(Continued)

*Primary Examiner* — Nathanael R Briggs
*Assistant Examiner* — Alexander Gross
(74) *Attorney, Agent, or Firm* — Collard & Roe, P.C.

(57) ABSTRACT

An optical-compensation film, an optical-compensation polarizing sheet and a liquid crystal display are disclosed. The liquid crystal display comprises: a liquid crystal unit as well as a first polarizing sheet and a second polarizing sheet each provided at either side of the liquid crystal unit, in which absorption axes of the first and second polarizing sheets are perpendicular to each other; the liquid crystal unit comprises: a counter substrate and an array substrate as well as a liquid crystal layer lying between the two substrates, in which, the array substrate comprises a pixel electrode and a common electrode; the first polarizing sheet comprises: a first optical-compensation film, which is provided facing the
(Continued)

liquid crystal unit; an absorption axis of the first polarizing sheet and an initial alignment direction of the liquid crystal in the liquid crystal layer are both perpendicular to a slow axis of the first optical-compensation film; the second polarizing sheet comprises: an isotropic protective film, which is provided proximate to a side of the liquid crystal unit where the array substrate is located. The liquid crystal display has improved contrast in an oblique plane and expanded viewing angles.

10 Claims, 7 Drawing Sheets

(51) Int. Cl.
  *G02B 5/30* (2006.01)
  *G02B 1/00* (2006.01)
  *G02F 1/1335* (2006.01)

(52) U.S. Cl.
  CPC .... *G02F 1/13363* (2013.01); *G02F 1/133634* (2013.01); *G02F 1/133528* (2013.01); *G02F 1/134363* (2013.01); *G02F 2001/133635* (2013.01); *G02F 2001/134372* (2013.01); *G02F 2201/50* (2013.01); *G02F 2413/01* (2013.01); *G02F 2413/10* (2013.01); *G02F 2413/11* (2013.01); *G02F 2413/12* (2013.01)

(56) References Cited

U.S. PATENT DOCUMENTS

| | | | |
|---|---|---|---|
| 2004/0207787 A1* | 10/2004 | Nakamura | G02F 1/13363 349/119 |
| 2006/0216439 A1 | 9/2006 | Shimizu et al. | |
| 2009/0207354 A1* | 8/2009 | Ikeda | G02F 1/133528 349/118 |
| 2011/0090433 A1 | 4/2011 | Sakuragi et al. | |
| 2011/0255038 A1* | 10/2011 | Chang | G02B 5/3083 349/96 |
| 2011/0285947 A1* | 11/2011 | Murakami | G02B 5/3083 349/118 |

FOREIGN PATENT DOCUMENTS

| | | |
|---|---|---|
| CN | 101576675 A | 11/2009 |
| CN | 102077132 A | 5/2011 |
| CN | 102414588 A | 4/2012 |

OTHER PUBLICATIONS

International Search Report for Published in English on Oct. 2, 2014.
Chinese Office Action of Chinese Application No. 201310097173.5, mailed Jan. 26, 2015 with English translation.
English translation of the International Preliminary Report on Patentability and Written Opinion of the International Searching Authority of PCT/CN2013/077916, issued Sep. 29, 2015.

* cited by examiner

OPTICAL-COMPENSATION FILM, OPTICAL-COMPENSATION POLARIZING SHEET AND LIQUID CRYSTAL DISPLAY

CROSS REFERENCE TO RELATED APPLICATIONS

This application is the National Stage of PCT/CN2013/077916 filed on Jun. 25, 2013, which claims priority under 35 U.S.C. §119 of Chinese Application No. 201310097173.5 filed on Mar. 25, 2013, the disclosure of which is incorporated by reference. The international application under PCT article 21(2) was not published in English.

TECHNICAL FIELD

Embodiments of the present invention relate to an optical-compensation film, an optical-compensation polarizing sheet and a liquid crystal display.

BACKGROUND

Liquid crystal displays (LCDs) are widely used in screen displays. According to initial alignment of liquid crystal, electrode structure and physical properties of liquid crystal, liquid crystal displays may be divided into modes as follows: Twisted Nematic (TN), Vertical Alignment (VA), In-plane Switching (IPS), Fringe Field Switching (FFS), ADvanced Super Dimension Switch (ADS), and so on.

An LCD has shortcomings of small-range and anisotropy of viewing angles, that is, its contrast decreases significantly when viewed along a direction deviated from a vertical line of the display panel. As to the current developing trend of LCD of large size and the situation of several people viewing, such shortcomings become particularly noticeable. Thus, in order to improve characteristics of viewing angles of an LCD, various techniques for achieving wide-viewing angles are proposed, such as IPS, FFS, ADS, MVA (Multi-domain vertical alignment), etc., all of which can increase the viewing angles of a liquid crystal display.

For example, for a liquid crystal display without an optical-compensation film, when viewed along a direction at a vertical viewing angle, as illustrated in FIG. 1, the projection axis of a lower polarizing sheet, the absorption axis of an upper polarizing sheet, as well as the optical axis of liquid crystal, are all at point A as indicated in the figure, and therefore this will not cause dark-state light leakage.

However, when viewed along an oblique direction, the projection axis of the lower polarizing sheet, the absorption axis of the upper polarizing sheet, as well as the optical axis of the liquid crystal, all deflect. For example, in a case where a polar angle is 60° and an azimuth angle is 45°, as illustrated in FIG. 2, the projection axis of the lower polarizing sheet is at the position of point T, whereas the absorption axis of the upper polarizing sheet as well as the optical axis of the liquid crystal are both at the position of point A, so the light entering from the lower polarizing sheet is at the point T, and after the action of the liquid crystal, arrives at point B as indicated by the arrow direction, resulting in that the light can not be completely absorbed by the absorption axis of the upper polarizing sheet, thereby causing light leakage. This results in poor contrast in an oblique plane, and therefore seriously affects the display quality of the LCD.

SUMMARY OF THE INVENTION

Embodiments of the present invention provide an optical-compensation film, an optical-compensation polarizing sheet and a liquid crystal display, which can improve the contrast in an oblique plane and expand the viewing angles of the liquid crystal display.

One aspect of the present invention provides an optical-compensation film, and the optical-compensation film is a negative biaxial optical anisotropic compensation film.

Further, for example, within a visible light wavelength range, the optical-compensation film has an in-plane retardance $R_o$ between 12 nm~55 nm and a refractive-index ratio NZ between 1.2~8.0, where $R_o=(nx-ny)\times d$, $NZ=(nx-nz)/(nx-ny)$, and $nx>ny>nz$; nx is a refractive index of the optical-compensation film along its in-plane X-axis direction, ny is a refractive index of the optical-compensation film along its in-plane direction perpendicular to nx, nz is a refractive index of the optical-compensation film along its thickness direction, and d is a thickness.

Another aspect of the present invention provides an optical-compensation polarizing sheet, comprising: a first optical-compensation film as well as a first polarizing film affixed to the first optical-compensation film; within a visible light wavelength range, the first optical-compensation film has an in-plane retardance $R_o$ between 12 nm~55 nm and a refractive-index ratio NZ between 1.2~8.0, where $R_o=(nx-ny)\times d$, $NZ=(nx-nz)/(nx-ny)$, and $nx>ny>nz$; where nx is a refractive index of the optical-compensation film along its in-plane X-axis direction, ny is a refractive index of the optical-compensation film along its in-plane direction perpendicular to nx, nz is a refractive index of the optical-compensation film along its thickness direction, and d is a thickness.

Yet another aspect of the present invention provides a liquid crystal display, comprising: a liquid crystal unit as well as a first polarizing sheet and a second polarizing sheet each provided at either side of the liquid crystal unit; an absorption axis of the first polarizing sheet is perpendicular to an absorption axis of the second polarizing sheet; the liquid crystal unit comprises: a counter substrate and an array substrate as well as a liquid crystal layer lying between the two substrates, in which the array substrate comprises a pixel electrode and a common electrode; the first polarizing sheet is an optical-compensation polarizing sheet as described above, and the first optical-compensation film of the first polarizing sheet is provided facing a side of the liquid crystal unit where the counter substrate is located; an absorption axis of the first polarizing sheet and an initial alignment direction of the liquid crystal in the liquid crystal layer are both perpendicular to a slow axis of the first optical-compensation film; the second polarizing sheet comprises an isotropic protective film as well as a second polarizing film affixed to the isotropic protective film, in which the isotropic protective film is provided proximate to a side of the liquid crystal unit where the array substrate is located.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE NUMERALS

Figure 1:
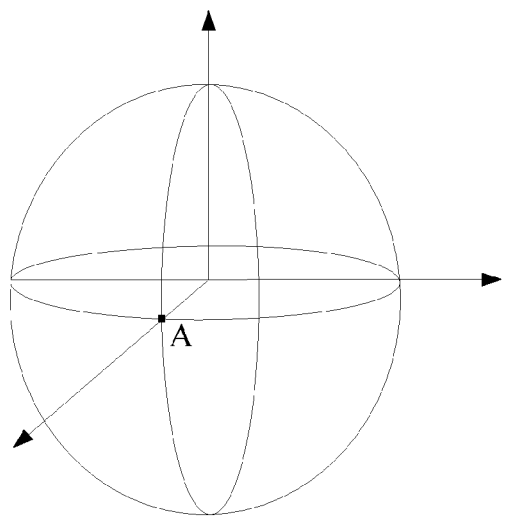
FIG. 1 is a schematic diagram of a conventional liquid crystal display without an optical-compensation film, when viewed along a direction at a vertical viewing angle and illustrated on a Poincaré sphere.
Figure 2:
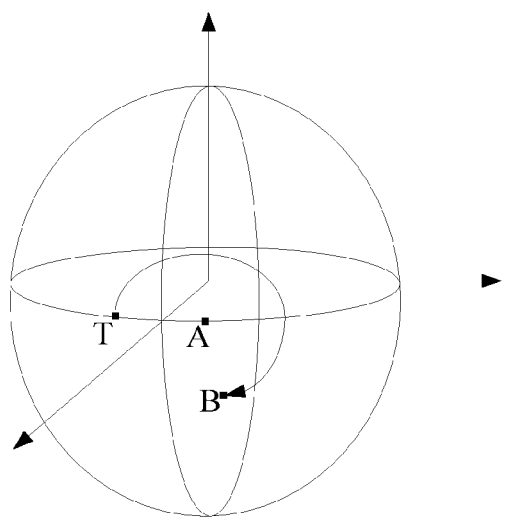
FIG. 2 is a schematic diagram of a conventional liquid crystal display without an optical-compensation film, when viewed along a direction at an oblique viewing angle and illustrated on a Poincaré sphere.

1—liquid crystal display; 10—optical-compensation polarizing sheet, 101—first protective film, 102—first optical-compensation film, 102a—slow axis of first optical-compensation film, 103—first polarizing film; 20—liquid crystal unit, 201—color-filter substrate, 202—array substrate, 202a—pixel electrode, 202b—common electrode, 203—liquid crystal layer; 30—first polarizing sheet, 301—absorption axis of first polarizing sheet; 40—second polarizing sheet, 401—absorption axis of second polarizing sheet, 402—second protective film, 403—isotropic protective film, 404—second polarizing film; 50—backlight unit.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical or scientific terms used herein should be interpreted in the normal meaning as understood by those ordinary skilled in the relevant art of the present invention. The terms "first", "second", and the like used in the specification and claims of this patent application of the invention, do not denote any order, quantity, or importance, but are used to distinguish among different integral parts. Likewise, herein the words "a", "an" or "the" or the like do not denote a limitation of quantity but the presence of at least one of the referenced item. The word "comprising" or "including" or the like refers to that the element or object which appears before this word encompasses the element(s) or object(s) and the equivalents which are enumerated after this word, and do not exclude other element(s) or object(s). The terms "connection" or "interconnection" or the like are not limited to physical or mechanical connections, but may comprise electrical connection, whether direct or indirect. The terms "on", "under", "left", "right" and the like are only used to indicate a relative positional relationship, which may be varied with a change of an absolute position of a described object.

An embodiment of the invention provides an optical-compensation film, and the optical-compensation film is a negative biaxial optical anisotropic compensation film.

A negative biaxial optical anisotropic compensation film has a refractive-index ratio greater than 1, its refractive index along X-axis direction is greater than its refractive index along Y-axis direction, and its refractive index along Y-axis direction is greater than its refractive index along Z-axis direction. The X axis and Y axis are two axes of a rectangular plane coordinate system in the plane of the compensation film, in which the X axis is a transverse-axis direction, and the Y axis is a longitudinal-axis direction. The Z axis is along the thickness direction of the optical anisotropic compensation film.

Further, for example, within the visible light wavelength range, the optical-compensation film has an in-plane retardance $R_o$ between 12 nm~55 nm and a refractive-index ratio NZ between 1.2~8.0, where $R_o=(nx-ny) \times d$, $NZ=(nx-nz)/(nx-ny)$, and $nx>ny>nz$; nx is the refractive index of the optical-compensation film along its in-plane X-axis direction, ny is the refractive index of the optical-compensation film along its in-plane direction perpendicular to nx, nz is the refractive index of the optical-compensation film along its thickness direction, and d is a thickness.

It should be noted that, in the embodiments of the invention, the visible light range refers to the visible light with wavelength in a range of 380 nm~780 nm; if NZ>1 and the refractive indices satisfy the relationship of $nx>ny>nz$, then the optical-compensation film is a negative biaxial optical anisotropic compensation film.

Typically, an optical material may have up to three different refractive indices, and may be classified as being isotropic or anisotropic, according to a relationship among the refractive indices. That is, if all the three refractive indices are equal, the material can be considered as being isotropic; if at least two of the all three refractive indices are unequal, the material can be considered as anisotropic. In addition, an anisotropic material may be further divided into a uniaxial type or a biaxial type. That is, if two of the three refractive indices are equal, then the material can be considered as a uniaxial type; if all the three refractive indices are unequal, then the material may be considered as a biaxial type.

Further, for example, an optical-compensation film has a retardance along its thickness direction which can be represented as $R_{th}$, and $R_{th}=[(nx+ny)/2-nz] \times d$. In this case, the aforementioned refractive-index ratio $NZ=(nx-nz)/(nx-ny)$ can be derived from $R_o=(nx-ny) \times d$ and $R_{th}=[(nx+ny)/2-nz] \times d$, thereby obtaining $NZ=R_{th}/R_o+0.5$.

The optical-compensation film provided by an embodiment of the invention may be manufactured by a biaxial-stretching method; modified-polystyrene (m-PS) or modified-polycarbonate (m-PC) can be chosen to prepare the optical-compensation film, and the preparation method may adopt a commonly-used technique in the related art, of which the description is omitted here.

It should be noted that the optical-compensation film provided by the embodiments of the invention is not limited to a film made from the above-mentioned materials of PS and PC, but may be any negative biaxial optical anisotropic compensation film as long as $R_o$ is between 12 nm~55 nm and the refractive-index ratio NZ is between 1.2~8.0 as discussed above.

In the embodiment of the invention, a compensation film is also referred to as a retardation film, and when it is used in a liquid crystal display, the optical-compensation film has a function of changing the phase of light transmitted therethrough, and thus compensating the light-phase retardation caused by liquid crystal molecules, and consequently expanding the viewing angles of the liquid crystal display.

Figure 3:
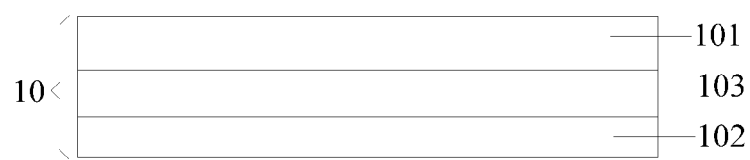
FIG. 3 is a schematic structural diagram of an optical-compensation polarizing sheet provided by an embodiment of the invention.

An embodiment of the invention provides an optical-compensation polarizing sheet, as illustrated in FIG. 3, and the optical-compensation polarizing sheet 10 comprises: a first optical-compensation film 102 as well as a first polarizing film 103 affixed to the first optical-compensation film 102; within the visible light wavelength range, the first optical-compensation film 102 has an in-plane retardance $R_o$ between 12 nm~55 nm and a refractive-index ratio NZ between 1.2~8.0, where $R_o=(nx-ny)\times d$, $NZ=(nx-nz)/(nx-ny)$, and nx>ny>nz; where the meaning of each symbol is the same as those described above.

Preferably, as illustrated in FIG. 3, the optical-compensation polarizing sheet 10 may further comprise: a first protective film 101; and the first protective film 101 is provided at the side of the first polarizing film 103 away from the first optical-compensation film 102.

The first polarizing film 103 may be used to provide a light-polarizing function. The first polarizing film 103, for example, may be prepared from an iodine-stained polyvinyl alcohol (PVA) film and subjected to a stretching treatment, thereby forming a polarizing thin film. Certainly, the first polarizing film 103 also may be prepared by staining a stretched PVA with iodine atoms, thereby forming a polarizing thin film, and obtaining a light-polarizing function.

Further, the slow axis of the first optical-compensation film 102 is perpendicular to the direction of the absorption axis of the first polarizing film 103.

"Slow axis" here is a relatively broad concept, which includes an optical axis. In general, as to an A-plate or C-plate, an optical axis is the same as a slow axis; if the optical axis is an in-plane direction of a film, then the film is called as an A-plate, and in that case nx>ny=nz; if the optical axis is vertical to the plane of the film, then the film is called as C-plate, and in that case nx=ny>nz.

The first protective film 101 and the first optical-compensation film 102 are provided on the opposite surfaces of the first polarizing film 103, thereby obtaining the optical-compensation polarizing sheet 10.

When the optical-compensation polarizing sheet 10 is applied to a liquid crystal display, the first protective film 101 is disposed away from the liquid crystal unit, and functions to protect the first optical-compensation film 102; also, as for the first protective film 101, since its refractive index does not affect viewing angles, so in the embodiments of the invention the refractive-index parameters of the first protective film 101 are not limited.

An embodiment of the invention provides an optical-compensation polarizing sheet, comprising: a first protective film 101, a first optical-compensation film 102, and a first polarizing film 103 provided between the first protective film and the first optical-compensation film. Here, the first optical-compensation film is also referred to as a negative biaxial optical anisotropic compensation film, which has an in-plane retardance $R_o$ between 12 nm~55 nm and a refractive-index ratio NZ between 1.2~8.0; when the optical-compensation polarizing sheet comprising the first optical-compensation film is applied in a liquid crystal display, it can improve the contrast in an oblique plane, thereby expanding the viewing angles of the liquid crystal display.

Figure 4:
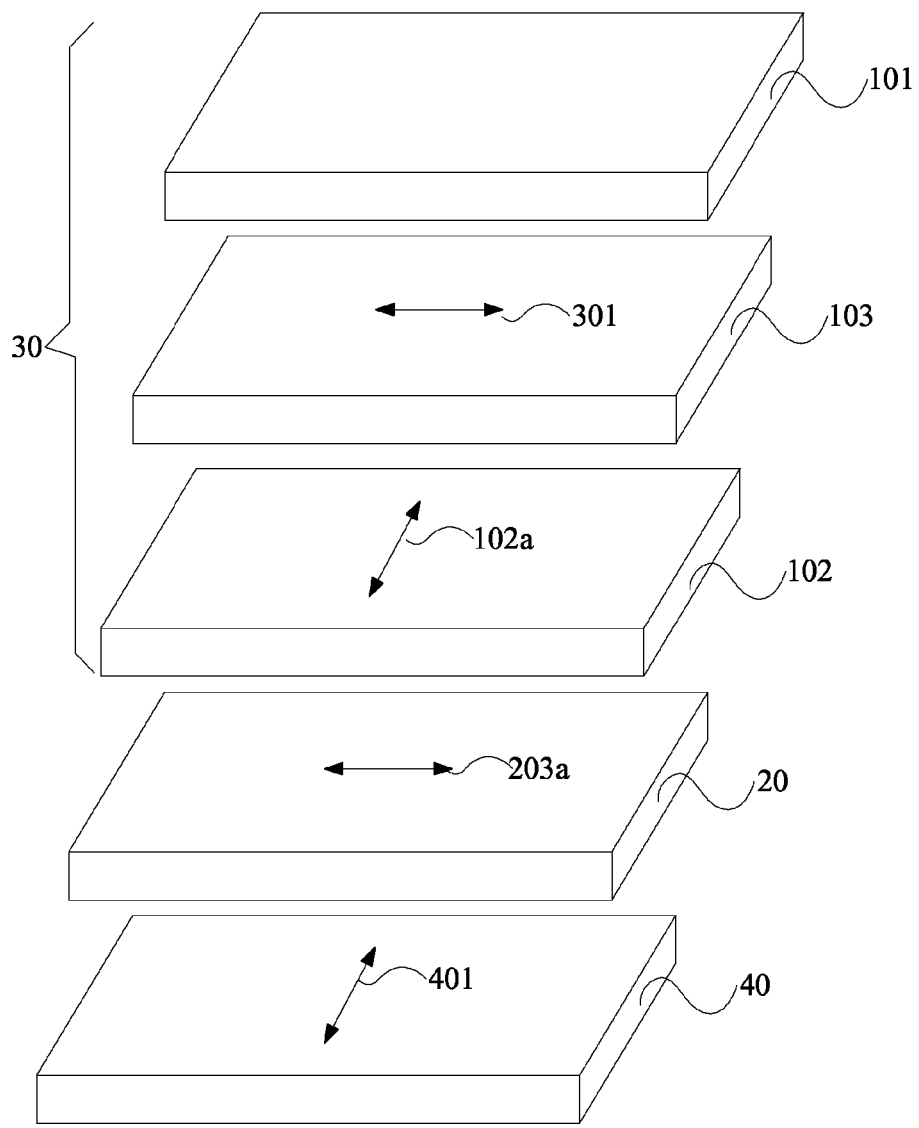
FIGS. 4-8 are first to fifth schematic structural diagrams of a liquid crystal display provided by an embodiment of the invention.
Figure 5:
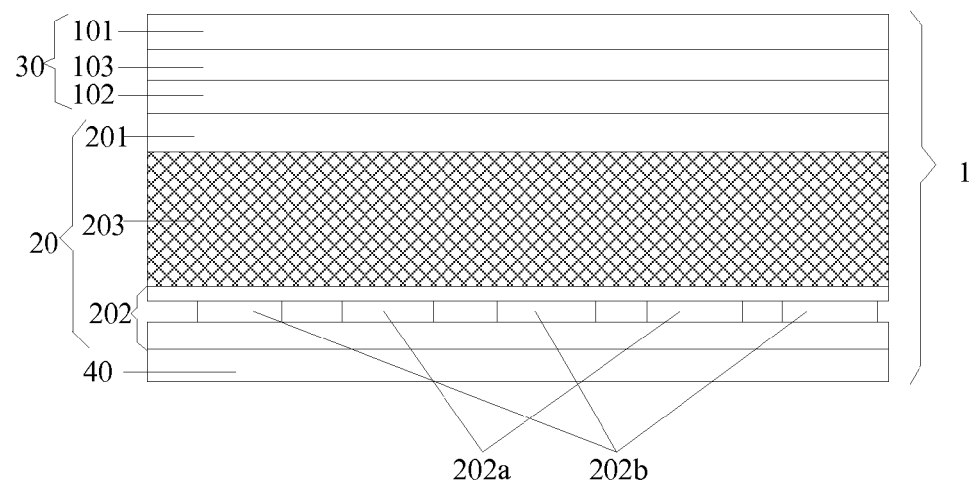
Figure 6:
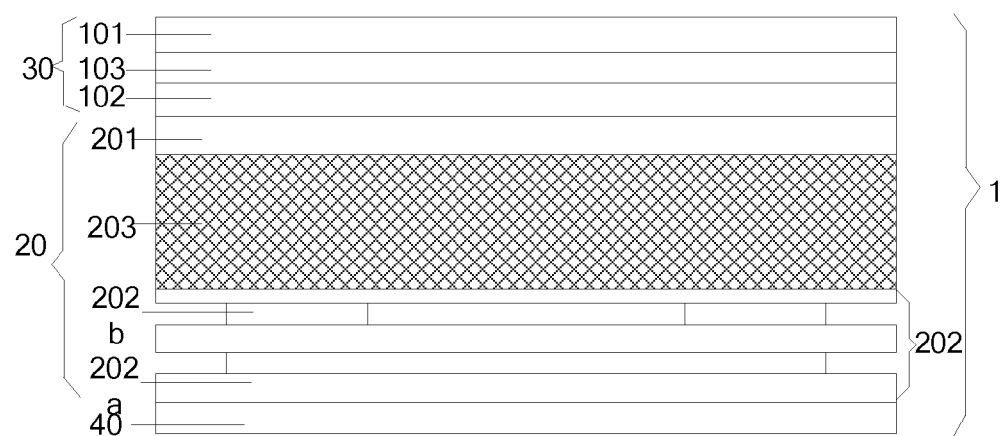

An embodiment of the invention provides a liquid crystal display. The liquid crystal display 1, as illustrated in FIGS. 4-6, comprises: a liquid crystal unit 20 as well as a first polarizing sheet 30 and a second polarizing sheet 40 each provided at either side of the liquid crystal unit 20, and the absorption axis 301 of the first polarizing sheet is perpendicular to the absorption axis 401 of the second polarizing sheet. For example, the liquid crystal unit 20 comprises: a color-filter substrate 201 and an array substrate 202 as well as a liquid crystal layer 203 lying between the two substrates. For example, the array substrate 202 comprises: a pixel electrode 202a and a common electrode 202b. Further, the first polarizing sheet 30 is an optical-compensation polarizing sheet as described above, and the first optical-compensation film 102 of the first polarizing sheet 30 is provided facing the side of the liquid crystal unit 20 where the color-filter substrate 201 is located; the absorption axis 301 of the first polarizing sheet and the initial alignment direction 203a of the liquid crystal in the liquid crystal layer are both perpendicular to the slow axis of the first optical-compensation film; the second polarizing sheet 40 comprises: an isotropic protective film 403 as well as a second polarizing film 404 affixed to the isotropic protective film 403, and the isotropic protective film 403 is provided proximate to the array-substrate 202 side of the liquid crystal unit.

Here, the color-filter substrate 201 is one example of a counter substrate; if the array substrate 202 is formed thereon with a color-filter structure, then the counter substrate no longer needs a color-filter structure to be formed thereon.

Here, the absorption axis 301 of the first polarizing sheet is exactly the absorption axis of the first polarizing film 103; the absorption axis 401 of the second polarizing sheet is exactly the absorption axis of the second polarizing film 404.

It should be noted that, the absorption axis 301 of the first polarizing sheet, the absorption axis 401 of the second polarizing sheet, the slow axis 102a of the first optical-compensation film, as well as the initial alignment direction 203a of the liquid crystal in the liquid crystal layer, are merely schematically illustrated in FIG. 4, and may not be limited thereto in practical applications, as long as they comply with the above-described conditions and can achieve an optical-compensation effect.

Preferably, for example, the first polarizing sheet 30 comprises the first protective film 101, the first optical-compensation film 102, as well as the first polarizing film 103 provided between the first protective film 101 and the first optical-compensation film 102. The absorption axis 301 of the first polarizing sheet is determined by the first polarizing film 103. The first polarizing film 103, for example, may be prepared from iodine-stained polyvinyl alcohol (PVA) and subjected to stretching, thereby forming a polarizing thin film; certainly, the first polarizing film 103 also can be prepared by staining stretched PVA with iodine, thereby forming a polarizing thin film, and obtaining a light-polarizing function.

Within the visible light wavelength range of 380 nm~780 nm, the first optical-compensation film 102 has an in-plane retardance $R_o$ between 12 nm~55 nm and a refractive-index ratio NZ between 1.2~8.0, where $R_o=(nx-ny)\times d$, $NZ=(nx-nz)/(nx-ny)$, and nx>ny>nz; and where the meaning of each of these parameters is as described above.

Preferably, for example, the liquid crystal display 1 may further comprise a second protective film 402; and the second protective film 402 is provided at the side of the second polarizing film 404 away from the isotropic protective film 403.

Preferably, for example, the isotropic protective film 403 of the second polarizing sheet 40 has an in-plane retardance between 0 nm~5 nm and a thickness-wise retardance in absolute value less than 10 nm.

The absorption axis 401 of the second polarizing sheet 40 is determined by the second polarizing film 404; the second polarizing film 404, for example, can be prepared from an iodine-stained polyvinyl alcohol (PVA) and subjected to a stretching treatment, thereby forming a polarizing thin film; certainly, the second polarizing film 404 also may be prepared by staining a stretched PVA with iodine, thereby forming a polarizing thin film, and obtaining a light-polarizing function.

In the embodiment of the invention, preferably, for example, the second polarizing sheet 40 comprises: the second protective film 402, the isotropic protective film 403, as well as the second polarizing film 404 provided between the second protective film 402 and the isotropic protective film 403; the isotropic protective film 403 is provided proximate to the array substrate 202 of the liquid crystal unit 20. As for the second protective film 402, since its refractive index does not affect viewing angles, in the embodiment of the invention the refractive-index parameters of the second protective film 402 are not limited.

Preferably, for example, within the visible light wavelength range, the liquid crystal unit 20 has a retardance between 360 nm~400 nm.

As an example, in an example where the visible light has a reference wavelength of 590 nm, the retardance of the light in the liquid crystal unit 20 can be represented by the following expression, i.e., $\Delta n \times d1 = (ne-no) \times d1$, in which $\Delta n \times d1$ can indicate the retardance; ne is the abnormal-light refractive index of liquid crystal, no is the normal-light refractive index, and d1 is the thickness of the liquid crystal unit 20. In the embodiment of the invention, preferably, the retardance of the liquid crystal unit 20 may be set as between 360 nm~400 nm.

In addition, the pixel electrode 202a and the common electrode 202b, which are provided on the array substrate 202, may be set in an IPS mode or an ADS (ADvanced Super Dimension Switch) mode.

FIG. 5 is one example of the electrode structure in an IPS-mode liquid crystal display. The pixel electrode 202a and the common electrode 202b are provided in a same layer, and they both comprise a plurality of electrically-connected strip-like electrodes; the strip-like electrodes of the pixel electrode 202a, as well as the strip-like electrodes of the common electrode 202b, are provided at intervals.

In addition, the pixel electrode 202a and the common electrode 202b also may be provided in different layers, but the common electrode 202b and the pixel electrode 202a do not overlap along an orthogonal-projection direction vertical to the substrate surface.

FIG. 6 is one example of the electrode structure in an FFS-mode liquid crystal display. As illustrated in FIG. 6, the pixel electrode 202a and the common electrode 202b are provided in different layers; moreover, the common electrode 202b lying in an upper layer is formed to comprise a plurality of electrically-connected strip-like electrodes; meanwhile, the pixel electrode 202a and the common electrode 202b have an overlapping portion along an orthogonal-projection direction vertical to the substrate surface. In this case, the common electrode 202b may comprise a slit structure or a comb-like structure, while the pixel electrode 202a lying in a lower layer is formed in a flat-plate shape. However, the embodiment of the invention is not limited thereto, for example, the pixel electrode 202a lying in the lower layer also may comprise a plurality of electrically-connected strip-like electrodes. In addition, the electrode lying in the upper layer also may be a pixel electrode and comprise a plurality of electrically-connected strip-like electrodes, while the electrode lying in the lower layer also may be a common electrode and is formed in a flat-plate shape or formed as a structure comprising a plurality of electrically-connected strip-like electrodes. It should be noted that, all the drawings only illustrate certain parts related to the present invention, while other parts are not indicated.

The exemplary electrode structure as illustrated in FIG. 6 also applies to an ADS mode liquid crystal display. The ADS mode forms a multi-dimensional electric field by combining, in a same plane, an electric field generated at edges of a slit electrode with an electric field generated between a slit electrode layer and a plate-like electrode layer, to cause liquid crystal molecules in all alignments, between the slit electrodes as well as over the electrodes, within a liquid crystal cell to rotate, thereby improving work efficiency of liquid crystal and increasing light transmission efficiency. The ADS technology can improve image quality of an LCD product, with advantages of high resolution, high transmittance, low power consumption, wide-viewing angles, high aperture ratio, low chromatic aberration, and free of push Mura, etc., and it can achieve wider-viewing angles when used in the present invention.

In all embodiments of the present invention, "(being) provided in a same layer" is respect to at least two patterns; the configuration in which at least two patterns are provided in a same layer means: the at least two patterns are formed from a same thin film through a patterning process. For example, as above described, the configuration in which the pixel electrode 202a and the common electrode 202b are provided in a same layer means: the pixel electrode 202a and the common electrode 202b are formed from a same transparent electrically-conductive thin film through a patterning process. The pixel electrode 202a refers to the electrode that is connected with a data line through a switch unit (e.g., a thin-film transistor), while the common electrode 202b refers to the electrode that is connected with a common-electrode line.

In all embodiments of the present invention, "(being) provided in different layers" is also respect to at least two patterns; the configuration in which at least two patterns are provided in different layers means: at least two patterns are formed from at least two thin-film layers through a patterning process, respectively. The configuration in which at least two patterns are provided in different layers means: one pattern is formed from each of the two thin-film layers through a patterning process. For example, the configuration in which an upper-layer electrode and a lower-layer electrode which are provided in different layers means: the lower-layer electrode is formed from a first layer of transparent electrically-conductive thin film through a patterning process, and the upper-layer electrode is formed from a second layer of transparent electrically-conductive thin film through another patterning process.

In all embodiments of the present invention, an upper layer and a lower layer are defined depending on their sequence in the manufacturing procedure; the lower layer refers to the layer that is formed earlier, and the upper layer refers to the layer that is formed later. It should be noted that, between the upper layer electrode and the lower layer electrode, which one is used as a common electrode and which one is used as a pixel electrode rely on their connection relationships. If the upper-layer (lower-layer) electrode is connected with a data line through a switch unit, then the upper-layer (lower-layer) electrode is used as a pixel electrode; if the upper-layer (lower-layer) electrode is connected with a common-electrode line, then the upper-layer (lower-layer) electrode is used as common electrode. In FIG. 6, illustration is made with an example in which the upper-layer electrode is used as a common electrode 202b and the lower-layer electrode is used as a pixel electrode 202a.

Figure 7:
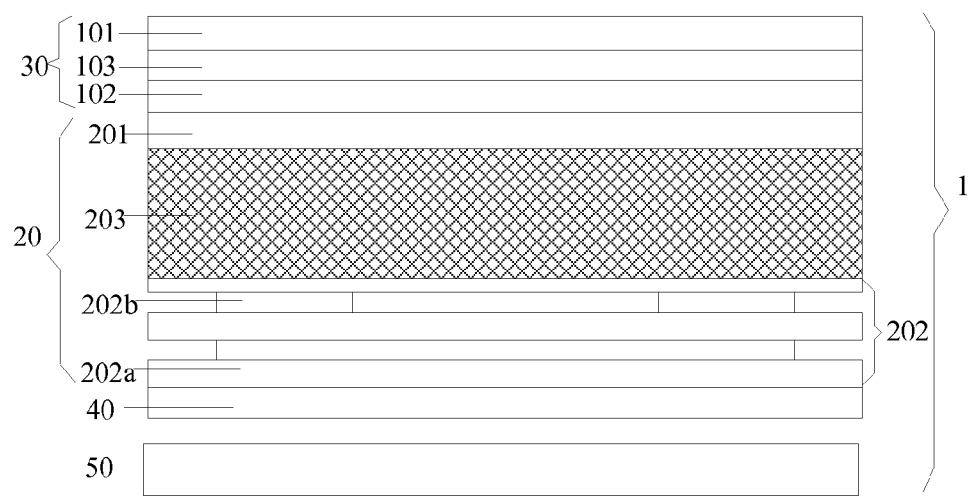
Figure 8:
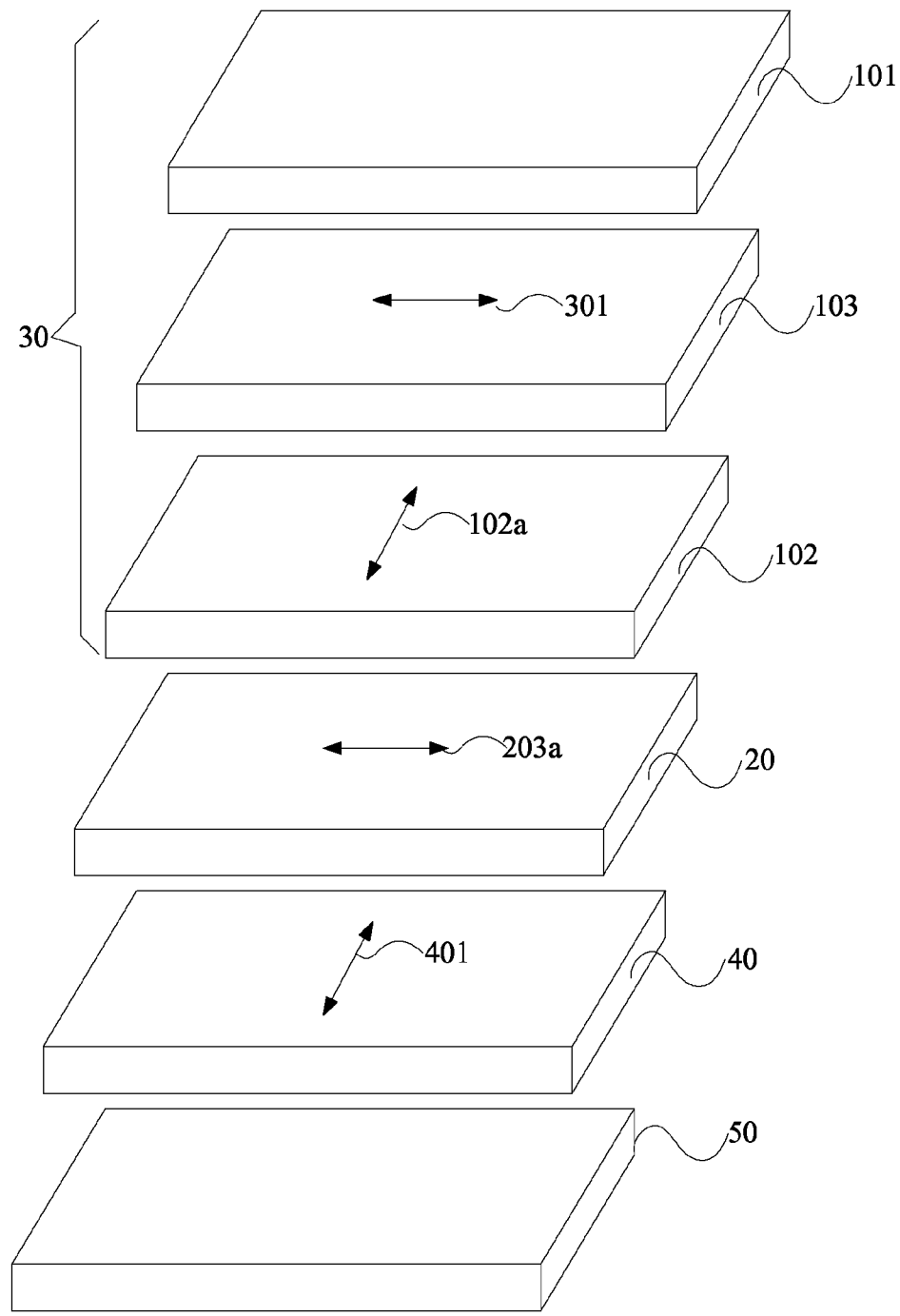

Further, as illustrated in FIG. 7- or FIG. 8, the liquid crystal display 1 may further comprise: a backlight unit 50; and the backlight unit 50 is provided proximate to the second polarizing sheet 40.

It should be noted that, FIG. 7 illustrates only the example where the pixel electrode 202a and the common electrode 202b are provided in different layers, however, the embodiments of the invention are not limited thereto, for example, the pixel electrode 202a and the common electrode 202b may be provided in a same layer.

For the liquid crystal display 1 of the embodiment of the invention, without considering the problem of viewing angles and the effect of an optical-compensation film, when the light emitted from the backlight unit 50 arrives at the second polarizing sheet 40, for example, with reference to FIG. 8, if the absorption axis 401 of the second polarizing sheet is along a vertical direction, then the light that has past through the second polarizing sheet 40 is in the horizontal polarization; and in the situation of no voltage being applied, since the direction of the absorption axis 301 of the first polarizing sheet is perpendicular to the direction of the absorption axis 401 of the second polarizing sheet, i.e., in this case, the absorption axis 301 of the first polarizing sheet is along a horizontal direction, so the horizontal-polarization light arriving at the first polarizing sheet 301 is absorbed by the first polarizing sheet 30, thereby exhibiting a "dark" state.

In the case of a voltage being applied, the horizontal-polarization light that has past through the second polarizing sheet 40 passes through the liquid crystal unit 20, and thereafter arrives at the first polarizing sheet 30 along a vertical direction, since the absorption axis 301 of the first polarizing sheet is along a horizontal direction, i.e., the transmission axis of the first polarizing sheet is along a vertical direction, thereby exhibiting a "bright" state.

The liquid crystal display provided by the embodiments of the invention, along the direction of an oblique plane (polar angle of 60° and azimuth angle of 45°), has the omnidirectional maximum transmittance satisfied with a compensation of 0.36% or less.

Below, with a particular embodiment, the effect of the present invention will be described in detail; with an optical-simulation program of LCD, the effect of wide-viewing angles has been simulated and confirmed.

Given that: the transmittance along a transmission axis of a wavelength is TD(λ), and the transmittance along an absorption axis of a wavelength is MD(λ), thus a visual-sensible polarization degree and a visual-sensible single transmittance satisfy the following expressions:

$$\text{Visual-sensible Polarization Degree} = \sqrt{\frac{T_{TD} - T_{MD}}{T_{TD} + T_{MD}}};$$

$$\text{Visual-sensible Single Transmittance} = \frac{T_{TD} + T_{MD}}{2}.$$

-continued $$\text{Where } T_{TD} = K \int_{380}^{780} S(\lambda)\bar{y}(\lambda)TD(\lambda)d\lambda;$$

$$T_{MD} = K \int_{380}^{780} S(\lambda)\bar{y}(\lambda)MD(\lambda)d\lambda;$$

$$K = \frac{100}{\int_{380}^{780} S(\lambda)\bar{y}(\lambda)MD(\lambda)d\lambda};$$

and S(λ) is the spectrum of a light source, typically a C light source, $\bar{y}(\lambda)$ is a compensation value defined in JIS Z8701: 1999.

It can be obtained by calculation that, within the visible light range of 380 nm~780 nm, the polarization degree is 99.99%, and the single transmittance is 42.5%. As known from the conventional technology, the higher the polarization degree is, the higher the contrast is. Therefore, the liquid crystal display provided by the embodiment of the invention, comprising a first optical-compensation film, has good contrast at an azimuth angle of 45°, as well as its single transmittance up to 42.5%.

Figure 9:
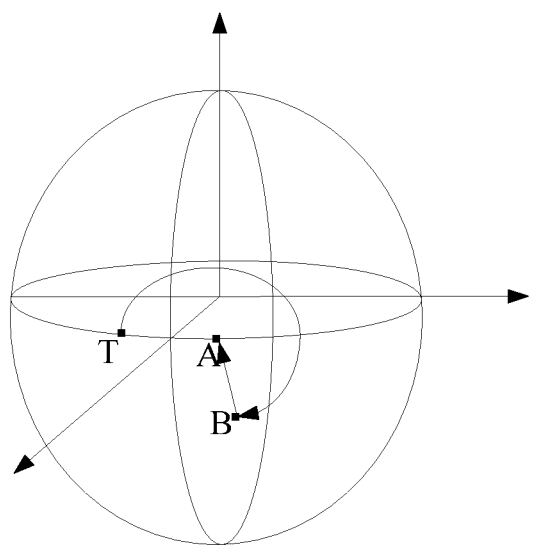
FIG. 9 is a schematic diagram of a polarization-state change of the liquid crystal display provided by the embodiment of the invention, when viewed along an oblique direction with a polar angle of 60° and an azimuth angle of 45° and illustrated on a Poincaré sphere.

In addition, with the visible light of 590 nm as an example, the isotropic protective film 403 of the second polarizing sheet 40 has an in-plane retardance of 0 nm and a thickness-wise retardance of 0 nm, and the first optical-compensation film 102 of the first polarizing sheet 30 has an in-plane retardance of 12 nm and a refractive-index ratio of 8, in this case, on a Poincaré sphere, the polarization-state change along an oblique direction of a polar angle of 60° and an azimuth angle of 45° is as illustrated in FIG. 9; in the figure, the transmission axis of the second polarizing sheet 40 is at the position of point T; the light of the backlight unit 50, after passing through the second polarizing sheet 40 and the liquid crystal layer 203, arrives at the first polarizing sheet 30 while reaching the position of point B, and then after passing through the first optical-compensation film 102 which has the in-plane retardance of 12 nm and the refractive-index ratio of 8, arrives at the first polarizing film 103 while reaching the point A, at which it is exactly coincident with the absorption axis 301 of the first polarizing sheet, i.e., the absorption axis of the first polarizing film 103; therefore, there is no light leakage. Further, as illustrated in FIG. 10, it can be seen from the omnidirectional distribution profile of transmittance that, the area of the central black section is enlarged, thus it is known that the liquid crystal display can achieve wider-viewing angles.

Figure 10:
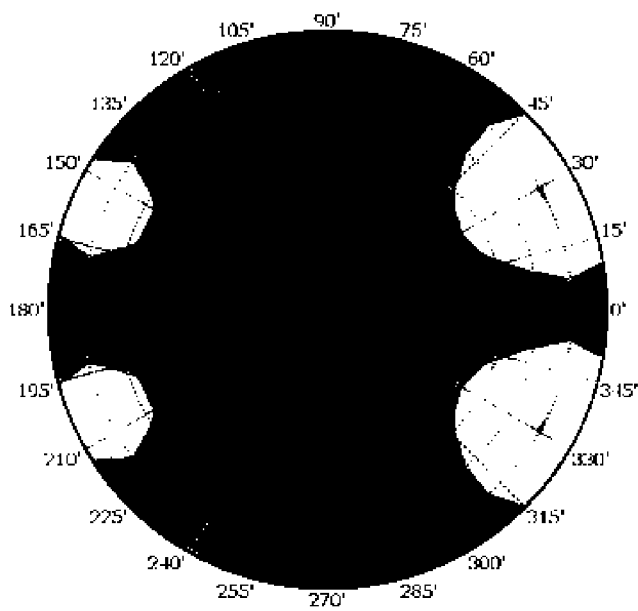
FIG. 10 is a schematic diagram showing an omnidirectional distribution profile of transmittance of a liquid crystal display provided by an embodiment of the invention.
Figure 11:
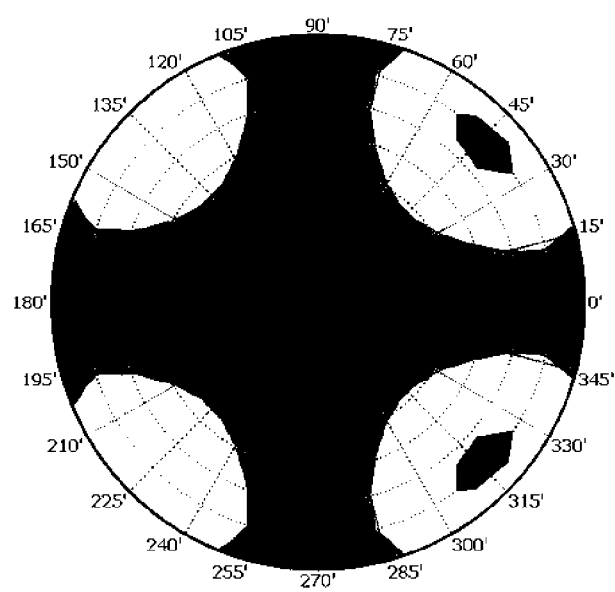
FIG. 11 is a schematic diagram showing an omnidirectional distribution profile of transmittance of a conventional liquid crystal display without an optical-compensation film.

In order to explain that FIG. 10 shows widened viewing angles, a description is given below, with a comparison to an omnidirectional distribution profile of transmittance of the liquid crystal display 1 without an optical-compensation film. As illustrated in FIG. 11, in comparison with FIG. 10, it can be seen that the area of the central black section is apparently narrower. As known from the conventional technology, the larger the area of the central black section, the wider the viewing angles.

In addition, with the visible light of 590 nm as an example, the isotropic protective film 403 of the second polarizing sheet 40 has an in-plane retardance of 0 nm and a thickness-wise retardance of 0 nm, and the first optical-compensation film 102 of the first polarizing sheet 30 has an in-plane retardance of 12 nm and a refractive-index ratio of 8, in this case, on a Poincaré sphere, the polarization-state change along an oblique direction of a polar angle of 60° and an azimuth angle of 45° can also achieve an effect similar to FIG. 9, and the omnidirectional transmittance can be similar to FIG. 10. As can be seen, in this case, the liquid crystal display of the embodiment can also achieve wider-viewing angles, that is, a human-eye-sensible change is greater than 0.36%, and therefore a maximum transmittance less than 0.36% is insensible to human eyes; in this way, it can solve the problem of human-eye-sensible light leakage, improve the contrast and enhance the display quality.

As known from the above, on a liquid crystal display, with an optical-compensation film having an in-plane retardance $R_o$ between 12 nm~55 nm and a refractive-index ratio NZ between 1.2~8.0, the contrast in an oblique plane can be improved, and the viewing angles of the liquid crystal display can thus be expanded. In addition, because the first polarizing sheet and the second polarizing sheet are both constituted by three layers of films, the liquid crystal display can be implemented in a thinner and lighter form.

The above are merely exemplary implementations of the present invention, but not for limiting the scope of the invention; instead, the scope of the invention should be defined by the appended claims.

The invention claimed is:

1. A liquid crystal display, comprising a liquid crystal unit as well as a first polarizing sheet and a second polarizing sheet each provided at either side of the liquid crystal unit, in which an absorption axis of the first polarizing sheet is perpendicular to an absorption axis of the second polarizing sheet;
   wherein the liquid crystal unit comprises: a counter substrate and an array substrate as well as a liquid crystal layer lying between the two substrates, in which, the array substrate comprises a pixel electrode and a common electrode;
   the first polarizing sheet is an optical-compensation polarizing sheet, and the first optical-compensation film of the first polarizing sheet is provided facing a side of the liquid crystal unit where the counter substrate is located;
   the absorption axis of the first polarizing sheet and an initial alignment direction of the liquid crystal in the liquid crystal layer are both perpendicular to the slow axis of the first optical-compensation film;
   the second polarizing sheet comprises: an isotropic protective film as well as a second polarizing film affixed to the isotropic protective film, in which, the isotropic protective film is provided proximate to a side of the liquid crystal unit where the array substrate is located;
   wherein, the optical-compensation polarizing sheet comprises: a first optical-compensation film as well as a first polarizing film affixed to the first optical-compensation film; wherein within a visible light wavelength range, the first optical-compensation film has an in-plane retardance $R_o$ between 12 nm~55 nm and a refractive-index ratio NZ between 1.2~8.0, where $R_o=(nx-ny)\times d$, $NZ=(nx-nz)/(nx-ny)$, and $nx>ny>nz$; where nx is a refractive index of the optical-compensation film along its in-plane X-axis direction, ny is a refractive index of the optical-compensation film along its in-plane direction perpendicular to nx, nz is a refractive index of the optical-compensation film along its thickness direction, and d is a thickness;
   when the liquid crystal display is an IPS-mode liquid crystal display, the pixel electrode and the common electrode are provided in a same layer, and they both comprise a plurality of electrically-connected strip-like electrodes; the strip-like electrodes of the pixel electrode, as well as the strip-like electrodes of the common electrode, are provided at intervals; or, the pixel electrode and the common electrode are provided in different layers, and the common electrode and the pixel electrode do not overlap along an orthogonal-projection direction vertical to the substrate surface;
   when the liquid crystal display is an FFS-mode liquid crystal display, the pixel electrode and the common electrode are provided in different layers; the common electrode lying in an upper layer is formed to comprise a plurality of electrically-connected strip-like electrodes; meanwhile, the pixel electrode and the common electrode have an overlapping portion along an orthogonal-projection direction vertical to the substrate surface.

2. The liquid crystal display according to claim 1, further comprising a second protective film, wherein the second protective film is provided at a side of the second polarizing film away from the isotropic protective film.

3. The liquid crystal display according to claim 1, wherein the isotropic protective film has an in-plane retardance between 0 nm~5 nm and a thickness-wise retardance in absolute value less than 10 nm.

4. The liquid crystal display according to claim 1, wherein within a visible light wavelength range, the liquid crystal unit has a retardance between 360 nm~400 nm.

5. The liquid crystal display according to claim 1, further comprising a backlight unit, wherein the backlight unit is provided proximate to the second polarizing sheet.

6. The liquid crystal display according to claim 2, further comprising a backlight unit, wherein the backlight unit is provided proximate to the second polarizing sheet.

7. The liquid crystal display according to claim 3, further comprising a backlight unit, wherein the backlight unit is provided proximate to the second polarizing sheet.

8. The liquid crystal display according to claim 4, further comprising a backlight unit, wherein the backlight unit is provided proximate to the second polarizing sheet.

9. The liquid crystal display according to claim 1, wherein a slow axis of the first optical-compensation film is perpendicular in direction to an absorption axis of the first polarizing film.

10. The liquid crystal display according to claim 1, the optical-compensation polarizing sheet further comprising: a first protective film;
    wherein the first protective film is provided at a side of the first polarizing film away from the first optical-compensation film.

* * * * *